United States Patent [19]

Sheppard et al.

[11] Patent Number: 5,594,431
[45] Date of Patent: Jan. 14, 1997

[54] REMOTE METER READING

[75] Inventors: Frank Sheppard, Loughton; Robert Goseltine, Bletchley, both of England

[73] Assignee: ABB Kent Plc, Bedfordshire, England

[21] Appl. No.: 307,564

[22] PCT Filed: Mar. 19, 1993

[86] PCT No.: PCT/GB93/00572

§ 371 Date: Dec. 8, 1994

§ 102(e) Date: Dec. 8, 1994

[87] PCT Pub. No.: WO93/19439

PCT Pub. Date: Sep. 30, 1993

[30] Foreign Application Priority Data

Mar. 19, 1992 [GB] United Kingdom ............... 9205977

[51] Int. Cl.⁶ .................................... G08C 23/00
[52] U.S. Cl. ............... 340/870.02; 340/870.18; 340/870.3; 340/870.31
[58] Field of Search ............ 340/870.02, 870.18, 340/870.3, 870.31, 870.32, 825.54, 310.02, 310.07

[56] References Cited

U.S. PATENT DOCUMENTS 5,252,967 10/1993 Brennan et al. .............. 340/870.02

FOREIGN PATENT DOCUMENTS 0254828 5/1987 European Pat. Off. .
0451445 1/1991 European Pat. Off. .

*Primary Examiner*—Jeffery Hofsass
*Assistant Examiner*—Andrew Hill
*Attorney, Agent, or Firm*—Hodgson, Russ, Andrews, Woods & Goodyear LLP

[57] ABSTRACT

A remote meter reading system, for example for domestic water meters, operates through an inductive coupling over two lines. A sinusoidal power signal is transmitted from a reader to the meter to power up encoding circuitry in the meter. The encoding circuitry then transmits data by intermittently shorting the input terminals to cause an asynchronous voltage modulation at the reader. There is no synchronous relationship required between the periodic power signal and the data transmitted from the encoder to the reader.

14 Claims, 3 Drawing Sheets

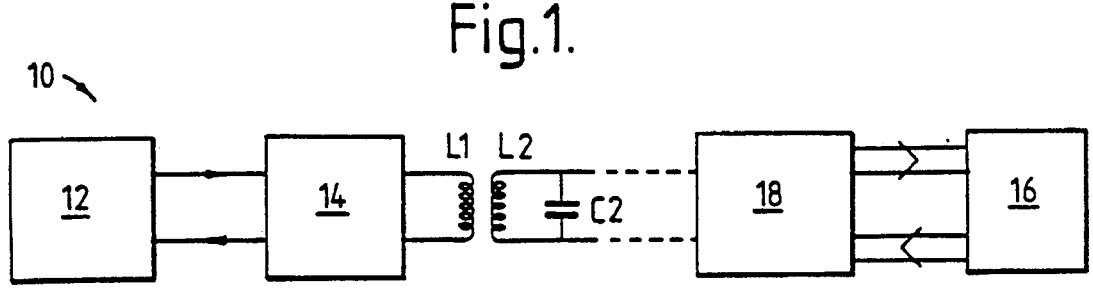
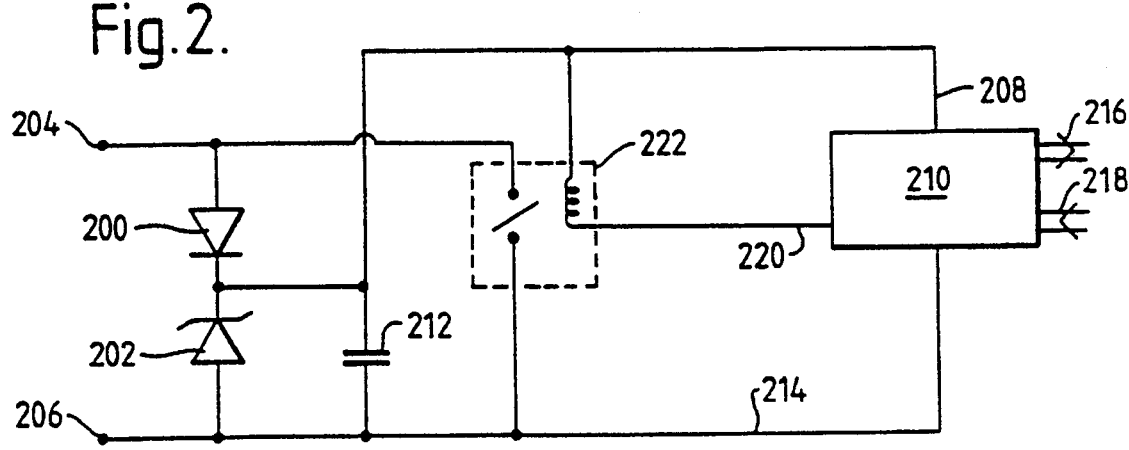
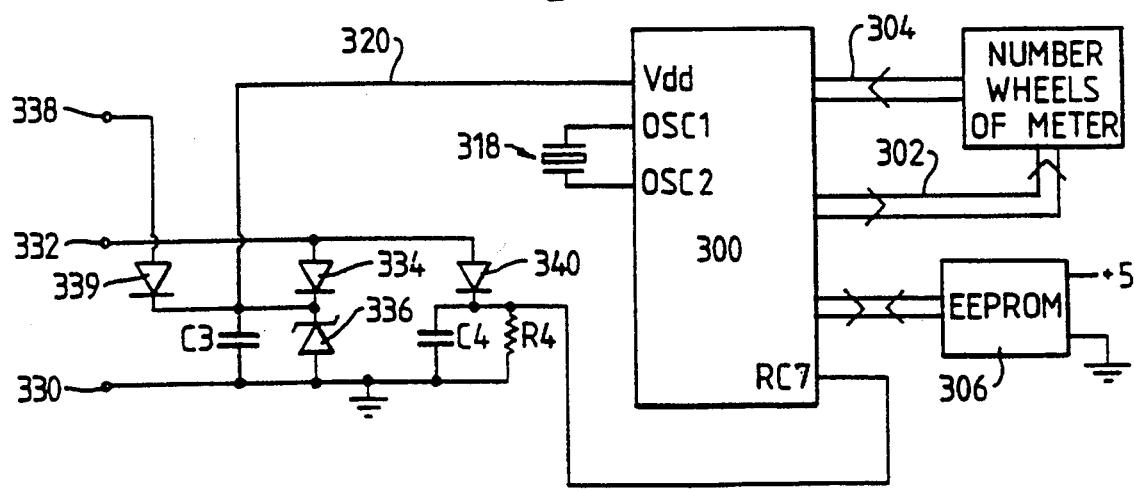

REMOTE METER READING

This invention relates to the remote reading of meters and in an important example to the remote reading by public utilities of water or other meters.

There already exist systems for the remote reading of water meters. Typically, each water meter is provided with an encoder capable of deriving a digital encoding of the meter reading. In the case of a water meter having conventional number wheels, the encoder may operate to sense electrically the position of the number wheels. Since each water meter is read relatively infrequently, the encoder means is not normally powered but derives the power necessary for encoding from the remote reader. The encoder may be situated entirely at the meter site or may include an interface connected with the meter but positioned for more straightforward access.

In one known arrangement, the encoder interface and the portable reader are connected by a plug and socket arrangement. In this way it is a simple matter to establish the necessary connections for the supply to the encoder of power and the necessary clock signal, and for transmission of data from the encoder to the reader. Plug and socket connections are regarded as inconvenient, however, and alternative prior proposals operate through inductive coupling. Suitable arrangements of coils in the encoder interface and the portable reader allow for the supply of power and clock information to the encoder and the transmission from the encoder of data. One particular prior proposal (see for example EP 0 131 732) enables the use of a single pair of coils. This has the advantage of significantly reducing the component cost at the encoder interface. In this prior proposal, there is developed a combined power and clock signal which comprises a relatively high frequency periodic signal within a square wave envelope. Thus the power signal comprises a regular succession of high frequency bursts. The encoder is arranged through careful timing no transmit during the gaps between these high frequency bursts. In fact, the transmission from the encoder takes the form of a like-burst of high frequency signal with the presence of such a burst between adjacent bursts of the power signal representing a binary "0" and the absence "1".

An alternative arrangement, disclosed in EP 0 463 893, is intended to operate under both plug and socket and inductive couplings. In the inductive coupling, or so-called "two wire" mode, data is transmitted by varying the current drawn by the meter interface, in synchronism with the interrogating clock signal. Thus, a change in current level every 16 clock cycles is interpreted as a logical "1", and a change in current level every 8 clock cycles as a logical "0".

It is an object of this invention to provide a remote meter reading system which can be implemented with one inductive coupling or other single channel but which does not rely for transmission or detection upon synchronization with the power signal.

Accordingly, the present invention consists in one aspect in a remote meter reading system comprising an encoder for association with a meter and a portable reader, the encoder having power terminal means for connection with a source of electrical power in the reader and adapted when powered to derive a digital encoding of the meter reading for transmission to the reader, characterised in that the encoder comprises impedance switch means serving to vary the input impedance at the power terminal means in representation of the digital encoding to provide a voltage variation detectable at said power source.

Advantageously, the encoder comprises a frequency reference controlling the timing of the impedance switch means.

Preferably, the reader generates a periodic power signal which is inductively coupled with the power terminals of the encoder, the period of said inpedance switch means being longer than the period of the power signal.

Suitably, the switch means comprises a diode connected between the power terminal means and a data line, the diode being selectively reverse biassed in dependence upon the level of said data line.

In one form of the invention, the portable reader further comprises means for amplitude modulation of said power signal, said impedance switch means serving additionally to decode said modulation.

It will thus be recognised that the present invention, through variation of impedance at the encoder, provides for the transmission of data on the power signal independently of the frequency of the power signal.

The invention will now be described by way of examples with reference to the accompanying drawings, in which:

FIG. 1 is an overview of a remote meter reading system according to the present invention;

FIG. 2 is a circuit diagram, partly in block form, of one embodiment of the encoder circuitry shown in FIG. 1;

FIG. 3 is a circuit diagram of another embodiment of the encoder circuitry shown in FIG. 1.

Figure 4:
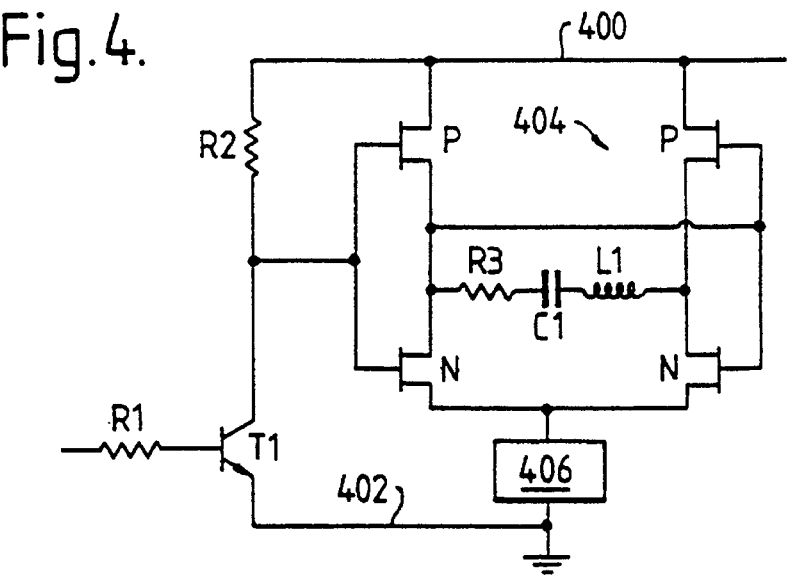
FIG. 4 is a circuit diagram of one embodiment of the drive circuit shown in FIG. 1.

Referring to FIG. 1, a portable reader 10 according to this invention comprises reader circuitry shown generally at 12 with a drive circuit 14 as a series tuned circuit with a coil L1. The reader 10 will typically be hand-held and the coil L1 will be positioned so that it can be easily be held against a wall plate or other interface for the meter encoder. The meter shown generally at 16 will have associated with it encoder circuitry 18 according to the present invention. Usually, the encoder circuitry will be provided in a common housing with the meter. A cable of appropriate length will be provided to connect the encoder circuitry 18 with a wall plate containing the coil L2. Typically, the meter will be located at the point at which the water supply enters the premises in question and the wall plate will be mounted on the exterior of the premises at a location offering convenient access for the meter reader. In the wall plate a capacitor C2 may be provided although, for longer runs of cable, the necessary capacitance will be provided by the cable itself.

As will be described in more detail, the reader circuitry 12 generates an output signal which is arranged to be the resonant frequency of the series tuned circuit comprising drive circuit 14 and coil L1. This is amplified in the drive circuit and transmitted to the encoder circuitry through the inductive coupling L1/L2. Efficient transmission is ensured through Q-matching of the transmitting and receiving circuits. The received signal is rectified in the encoder circuitry 18 to provide the necessary power level. In contrast with certain prior arrangements, the AC power signal is substantially continuous in the sense that there are no transmission intervals provided for the transmission of data. Instead, data is transmitted by effectively shorting the input terminals of the encoder 18 so as to produce an amplitude modulation of the sinusoidal power signal, detectable at the reader. The power signal is not used as a clock and the frequency is chosen as a matter of convenience. In the present example the frequency is selected for comparability with a standard communication rate of 9600 Baud, the relatively low frequency itself offering advantages. First, problems of electromagnetic interference are minimal. Second, it is possible to achieve adequate inductive coupling with simple and inexpensive coils.

There is shown in FIG. 2 one embodiment of the encoder circuitry 18.

A diode 200 is connected in series with an opposed Zener diode 202, between the input terminals 204 and 206 of the encoder circuitry. The junction of the diodes is connected to the supply voltage input 208 of a microprocessor 210, as well as to a smoothing capacitor 212 connected in turn to rail 214. This rail is connected to the input terminal 206.

The microprocessor 210 communicates with the meter through interrogation lines 216 and data input lines 218. A data output signal appears on microprocessor output pin 220.

A relay 222 is connected between input terminal 204 and (through rail 214) input terminal 206. The relay coil is connected between the positive supply and the data output pin 220, such that effective shorting of the input terminals takes place in representation of the microprocessor generated data signal. This shorting does not adversely affect operation of the microprocessor 210 but produces in a very simple manner a voltage modulation which can be deducted at the reader circuitry 12.

Turning now to FIG. 3, there is shown partly in block form, an alternative embodiment of the encoder circuitry 18. A microcontroller 300 is driven at a 500 KHz clock rate using for reference a crystal 318 connected at pins OSC1 and 0SC2. The micro-controller 300 receives power at pin Vdd from supply rail 320. The micro-controller 300 may suitably be one commercially available from Microchip Technology Inc in the PIG 16C5X series.

The manner in which the micro-controller provides a digital encoding of the meter reading is generally conventional, although the use of a micro-controller offers advantages over the typical microprocessor arrangement. For a more detailed explanation, reference is directed to EP 0 319 352. Briefly, the number wheels of the meter are polled using six output lines 302 with a signal indicative of the position of each number wheel in the zero to nine range being taken to the micro-controller 300 on the ten lines 304. In a preferred feature of the present invention, the serial number of the meter is stored, not in hardwired links interrogated in the same manner as the number wheels, but in EEPROM 306.

The micro-controller 300 is internally programmed to interrogate the number wheels and the serial number in EEPROM 306 and to generate an output signal on pin RC7 using an appropriate protocol. This may typically be ASCII.

The input terminals in this embodiment of the encoder circuitry are shown in FIG. 3, at 330 and 332. Rectifying diode 334 and level setting Zener diode 336 are connected in series across the input terminals with their mid-point driving the supply rail 320 conveniently at a nominal +5 V. A smoothing capacitor C3 is connected in parallel with the Zener diode 336.

To provide compatibility with existing "three-pin" arrangements, an additional input terminal 338 can accept as required, AC, DC or mono-polar pulsed DC. The voltage is taken through diode 339 to drive the supply rail 320.

Pin RC7 of the micro-controller 300, on which the data signal appears, is connected to the input terminal 332 through diode 340. The pin is also connected to the input terminal 330 through the parallel circuit R4, C4. The micro-controller 300 transmits data by pulling RC7 low, so effectively shorting the input terminals 332, 330 through diode 340. This change in input impedance results in a shift in the amplitude of the signal at the resonant frequency of the series tuned circuit, which can be detected at the reader.

Since this invention is concerned with voltage modulation, it is desirable for the encoding circuitry to be driven at constant current. An embodiment of the drive circuitry 14 which operates at constant current will be now described with reference to FIGS. 4 and 5.

Turning first to FIG. 4, a signal at—for example—9.6 KHz is taken from the reader circuitry to the base of a junction transistor T1 through series resistance R1. The collector of T1 is connected through resistance R2 to a suppy rail 400; the emitter of T1 is connected to a ground rail 402. An FET bridge shown generally at 404 is connected between the supply rail 400 and a constant current circuit 406 which is in turn connected with the ground rail 402. The FET bridge consists of two N type FETs and two P type FETs. One side of the bridge is connected with the collector of transistor T1. The drive coil L1 is connected across the bridge with resistance R3 and capacitance C1 providing the necessary tuned circuit.

Figure 5:
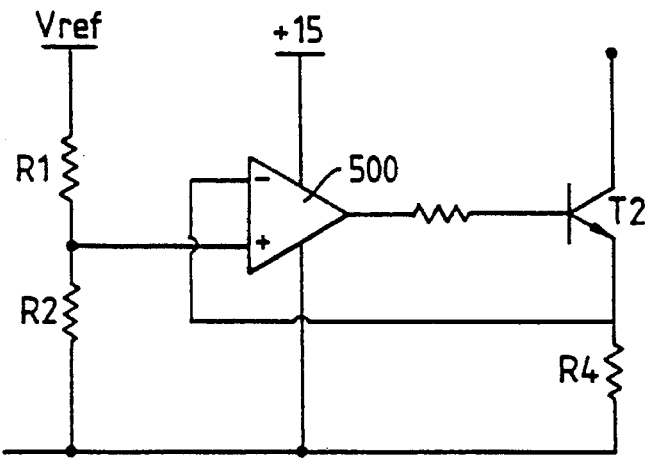
FIG. 5 is a more detailed circuit diagram of the constant current source of FIG. 4.

The constant current circuit 406 may take a variety of known forms. One such form is shown in FIG. 5. An operational amplifier 500 has its non-inverting input connected to a potential divider R1/R2 connected between the ground rail and a voltage reference. The output of the operational amplifier is taken through a resistance R3 to the base of transistor T2. This transistor has its collector connected with the FET bridge and its emitter connected through resistance R4 with the ground rail. The junction between the emitter of transistor T2 and resistance R4 is connected to the inverting input of the operational amplifier. In this way it is ensured that the current drawn through the FET bridge, and thus the drive current for the encoder circuitry, is maintained sensibly constant.

To illustrate the manner in which data is transmitted according to the present invention, reference is directed to the signal plots which form FIG. 6. The 9.6 KHz signal transmitted by the reader is shown at 6(a). The data signal appearing on pin RC7 of the micro controller is shown at 6(b). FIG. 6(c) shows the amplitude modulated signal, as detected at the reader, which arises through shorting of the encoder input terminals in dependence upon the level of pin RC7. It will be seen than the envelope of the 9.6 KHz signal carries the data.

The frequency of modulation, in this example 1.2 KHz, is less than the frequency of the carrier by a factor of 8. This minimises the effect of edge detection of the modulation varying by one cycle of the carrier. It should be stressed that the invention does not rely upon a contact phase or frequency relationship between the power signal and the transmitted data.

Figure 7:
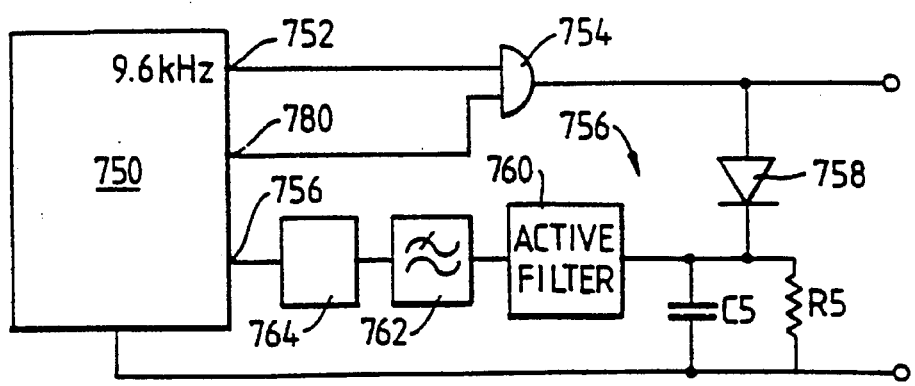
FIG. 7 is a circuit diagram, partly in block form of the reader circuitry shown in FIG. 1.

The manner in which the amplitude variation is detected at the reader will now be described, referring to FIG. 7.

The reader 12 comprises a microprocessor based unit 750, the detail of which is not germane to the present invention. Broadly speaking, the unit 750 includes, in addition to the microprocessor, memory for snoring meter readings, a key pad, a status display and a port for downloading snored readings for further processing. The unit 750 generates at output terminal 752 the required 9.6 KHz signal. This signal is taken through AND gate 754 to the line input of the series tuned circuit described with reference to FIG. 5. A detection circuit shown generally at 756 is connected between the line and ground terminals. This detection circuit comprises a diode 758 connected in series with a parallel attenuation circuit R5, C5. A signal is taken from the diode 758 to a sixth order active filter 760 which serves to eliminate the 9.6 KHz frequency. The resulting signal is passed through a high gain, low pass filter 762 and pulse shaper 764 to provide at input terminal 756 a signal corresponding essentially with the data output of the micro-controller.

Figure 6A:
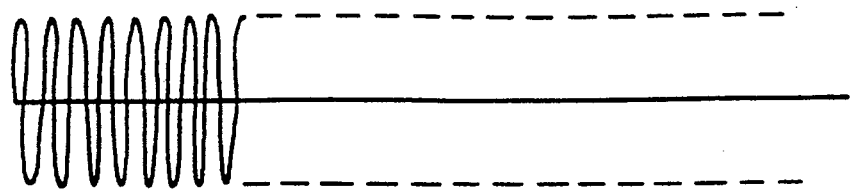
FIG. 6 is a series of signal plots.
Figure 6B:
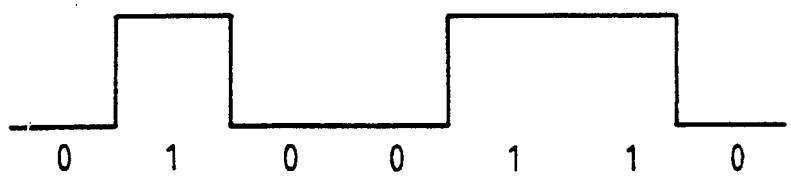
Figure 6C:
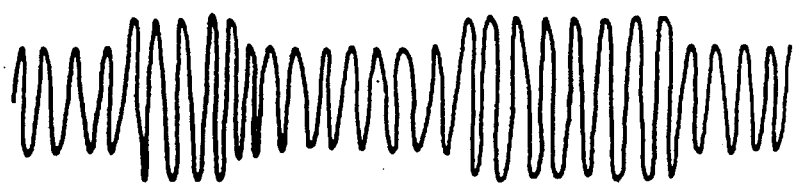
Figure 6D:
Figure 6E:
Figure 6F:
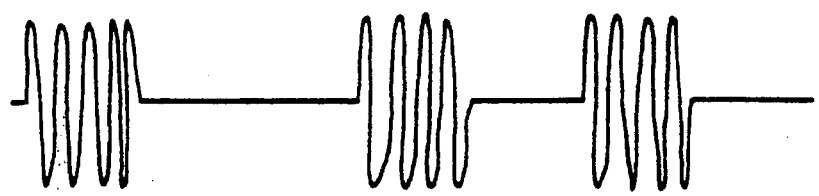

By way of further illustration, there is shown at FIG. 6(d) the rectified signal produced by diode 758 filtered in active filter 760, and at FIG. 6(e) the output arising from the combined effect of low pass filter 762 and pulse shaper 764.

It has been explained that the meter serial number is, according to this invention, stored in an EEPROM. In a preferred feature, the reader according to this invention is capable, under controlled conditions, of reprogramming the serial number. As will be understood, this involves the transmission of data from the reader to the encoder. Whilst the provision of additional circuitry within the reader to provide for the encoding of such data would not be a particular inconvenience (there being a relatively small number of reader units in any one installation), the provision of additional decoding circuitry at each meter would represent a significant further cost. For this reason, the present invention ingeniously provides for the decoding at the meter of serial number data transmitted from the reader, using substantially the same components as are provided for the "normal" data transmission.

Figure 6G:
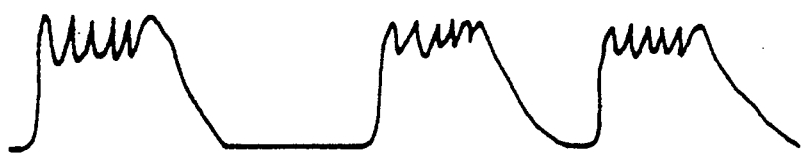

At the reader, a serial number data stream is provided at terminal 780 which serves as the second input for the described AND gate 754. In this way, the 9.6 KHz is modulated, a typical signal being illustrated at FIG. 6(f). At the micro-controller 300, by virtue of the diode 340, a half wave rectified version of the modulated 9.6 KHz signal appears at input pin RC7, with an amplitude set by circuit C4/R4. A typical signal of this point in the circuit is shown at FIG. 6(g). The difference in waveform between FIGS. 6(f) and 6(g) can be attributed to the reactance in the system. With the pin RC7 reconfigured as an input, the micro-controller is programmed to sample the modulated signal and readily detects the serial number data for writing to the EEPROM 326.

An appropriate "handshake" is established between the reader and the encoder to control the transmission of data from the encoder and, if desired, the reconfiguring that is required for the transmission of data to the encoder. According to one handshake protocol, the encoder transmits data for a ten second interval and then reconfigures pin RC7 as an input. In the case of a normal reading, a validated reading of both the meter and the serial number will have been accomplished within the ten second period; the reader will be physically removed and the encoder circuitry de-energized. If, however, it is desired to re-program the serial number, the reader is left in position and an appropriate interval after the end of the ten second period, the new serial number data is transmitted to the encoder as described. This is converted into a bit stream within the micro-controller and passed to the EEPROM. After a further interval, the encoder re-transmits the meter reading and the serial number permitting validation of the new serial number.

It should be understood that this invention has been described by way of examples only and a wide variety of modifications are possible without departing from the scope of the invention. Thus a diode connected between the power terminal of the encoder and a data output line is a particularly elegant method of effectively shorting the input terminals, the skilled man will appreciate that a variety of circuits possibly including active devices—would serve the same function. This use of a relay has already been mentioned; further alternatives are a photo-transistor/photo diode pair or a photo-thyristor/photo diode pair. It will not always be necessary for serial numbers or other reprogramming data to be transmitted to the encoder. Where this is required, the use of the same switching circuit to detect the amplitude modulation of the applied power signal, will offer a significant economy of components. The frequencies of the power signal and the modulation of that signal can be varied to suit the requirements of any particular application. The frequency of modulation is preferably lower by a factor of at least eight. Whilst it is convenient for the frequencies to be related by an even integral multiplier, it is not essential. Since the power signal is not used for timing, variations in frequency can of course be accommodated.

We claim:

1. A remote meter reading system, comprising an encoder for association with a meter and a portable reader, the encoder having power terminal means for connection with a source of electrical power in the reader generating a periodic power signal and adapted when power by said signal to derive a digital encoding of the meter reading for transmission to the reader, wherein the encoder comprises impedance switch means serving to vary the input impedance at the power terminal means in representation of the digital encoding to provide a voltage variation detectable at said power source, said encoder comprising a frequency reference controlling the timing of said impedance switch means so that the operation of said impedance switch means is asynchronous with the power signal and there is no synchronous relationship required between the power signal and data transmitted from the encoder to the reader.

2. A system according to claim 1, wherein the reader generates a periodic power signal which is inductively coupled with the power terminals of the encoder.

3. A system according to claim 1, wherein the minimum period of operation of said impedance switch means is greater than the period of the power signal.

4. A system according to claim 1, wherein the switch means comprises diode connected between the power terminal means and a data line, the diode being selectively reverse biassed in dependence upon the level of said data line.

5. A system according to claim 1, wherein the portable reader further comprises means for amplitude modulation of said power signal, said impedance switch means serving additionally to decode said modulation.

6. A system according to claim 1, wherein the reader includes a constant current drive circuit whereby the encoder is powered at a constant current.

7. A system according to claim 1, wherein a storage means is operatively associated with the encoder for storing meter serial number information, wherein the reader includes means for modulating the power signal with a meter serial number data stream, and wherein the encoder further includes:

a) means for detecting said meter serial number data stream from the power signal;

b) means for applying the detected meter serial number data stream to said storage means for changing the meter serial number information in said storage means; and c) means for providing a reconfiguration to allow transmission of data from the reader to the encoder.

8. A remote meter reading system, comprising an encoder for association with a meter and a reader, the encoder having power terminal means for connection with the reader and adapted when powered to derive a digital encoding of the meter reading for transmission to the reader, wherein the encoder comprises switch means serving intermittently to short the power terminal means in representation of the digital encoding; and wherein the reader comprises a power source adapted to generate a periodic power signal; and detector means for detecting an asynchronous voltage modulation in said power signal consequent upon said intermittent shorting of the encoder power terminal means.

9. A system according to claim 8, wherein said detector comprises means for filtering said periodic power signal.

10. A system according to claim 8, wherein the periodic power signal is inductively coupled with the power terminals of the encoder, operation of said impedance switch means being asynchronous with the power signal.

11. A system according to claim 8, wherein the reader includes a constant current drive circuit whereby the encoder is powered at a constant current.

12. A system according to claim 8, wherein the encoder comprises a frequency reference controlling the timing of the switch means.

13. A system according to claim 8, wherein the minimum period of operation of said switch means is greater than the period of operation of the power signal.

14. A system according to claim 8, wherein a storage means is operatively associated with the encoder for storing meter serial number information, wherein the reader includes means for modulating the power signal with a meter serial number data stream, and wherein the encoder further includes:

a) means for detecting said meter serial number data stream from the power signal;

b) means for applying the detected meter serial number data stream to said storage means for changing the meter serial number information in said storage means; and c) means for providing a reconfiguration to allow transmission of data from the reader to the encoder.

\* \* \* \* \*